United States Patent
Ljung et al.

(10) Patent No.: US 9,749,918 B2
(45) Date of Patent: Aug. 29, 2017

(54) HANDOVER PROCEDURE FOR DIRECTLY CONNECTING A MOBILE TERMINAL TO A BASE STATION PREVIOUSLY CONNECTED TO THE BASE STATION VIA A RELAY TERMINAL

(71) Applicant: Sony Corporation, Tokyo (JP)

(72) Inventors: Rickard Ljung, Helsingborg (SE); Saif Alnashi, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 25 days.

(21) Appl. No.: 14/099,855

(22) Filed: Dec. 6, 2013

(65) Prior Publication Data
US 2015/0163712 A1 Jun. 11, 2015

(51) Int. Cl.
*H04W 36/08* (2009.01)
*H04W 36/00* (2009.01)
*H04B 7/155* (2006.01)
*H04W 76/04* (2009.01)
*H04B 7/14* (2006.01)
*H04W 88/04* (2009.01)

(52) U.S. Cl.
CPC .............. *H04W 36/08* (2013.01); *H04B 7/14* (2013.01); *H04B 7/15507* (2013.01); *H04W 36/00* (2013.01); *H04W 76/043* (2013.01); *H04W 88/04* (2013.01)

(58) Field of Classification Search
CPC ...................................................... H04W 36/08
See application file for complete search history.

(56) References Cited

U.S. PATENT DOCUMENTS

| | | |
|---|---|---|
| 2010/0322193 A1 | 12/2010 | Hu et al. |
| 2011/0117907 A1 | 5/2011 | Hooli et al. |
| 2011/0194485 A1* | 8/2011 | Horneman et al. ........... 370/315 |
| 2011/0258327 A1* | 10/2011 | Phan et al. .................... 709/227 |
| 2013/0244661 A1* | 9/2013 | Lin et al. ...................... 455/436 |

(Continued)

FOREIGN PATENT DOCUMENTS

| | | | |
|---|---|---|---|
| WO | 2013042979 A2 | 3/2013 | |
| WO | WO 2013042979 A2 * | 3/2013 | ........ H04W 36/0016 |
| WO | 2013086316 A1 | 6/2013 | |

OTHER PUBLICATIONS

Raghothaman, Balaji et al., "Architecture and Protocols for LTE-based Device to Device Communication", Computing, Networking and Communications (ICNC), 2013 International Conference on, IEEE, Jan. 28, 2013, pp. 895-899 XP032377019, DOI: 10.1109/ICCNC.2013.6504208, ISBN: 978-1-4673-5287-1.

(Continued)

*Primary Examiner* — Vladimir Magloire
*Assistant Examiner* — David Orange
(74) *Attorney, Agent, or Firm* — James C. Edwards; Moore & Van Allen PLLC

(57) ABSTRACT

The invention is directed to systems, methods and computer program products for executing a handover operation associated with relay termination. Specifically, the handover operation entails directly connecting a mobile terminal to a base station, which is currently connected to the base station via a relay terminal, and, subsequent to establishing the direct connection, terminating the connection between the mobile terminal and the relay terminal.

7 Claims, 6 Drawing Sheets

(56) References Cited

U.S. PATENT DOCUMENTS

| | | |
|---|---|---|
| 2013/0331090 A1* | 12/2013 | Kim et al. ................. 455/422.1 |
| 2014/0017991 A1* | 1/2014 | Chang et al. ..................... 455/7 |
| 2014/0135019 A1* | 5/2014 | Jang et al. ................... 455/437 |
| 2014/0155114 A1* | 6/2014 | Wu .............................. 455/509 |
| 2014/0185587 A1* | 7/2014 | Jang et al. ................... 370/331 |
| 2014/0226629 A1* | 8/2014 | Kim et al. ................... 370/331 |
| 2014/0233386 A1* | 8/2014 | Jamadagni et al. .......... 370/235 |
| 2015/0045033 A1* | 2/2015 | Kim .................. H04B 7/15507 455/436 |

OTHER PUBLICATIONS

International Search Report and Written Opinion; Feb. 23, 2015; issued in International Patent Application No. PCT/EP2014/073657.

* cited by examiner

HANDOVER PROCEDURE FOR DIRECTLY CONNECTING A MOBILE TERMINAL TO A BASE STATION PREVIOUSLY CONNECTED TO THE BASE STATION VIA A RELAY TERMINAL

BACKGROUND

Mobile terminals move in and out of network coverage. Some mobile terminals have direct connections to a base station associated with a network, while other mobile terminals connect to the network via a relay procedure using other terminals. There is a need to manage the establishment and termination of these relay procedures.

BRIEF SUMMARY

Embodiments of the invention are directed to systems, methods and computer program products for executing a handover associated with relay termination. An exemplary method comprises: receiving, at a first base station associated with a network, a network registration request from a first terminal, the first terminal being connected to the first base station via a relay terminal; establishing a direct connection between the first base station and the first terminal; and terminating the connection between the first terminal and the relay terminal.

In some embodiments, the method further comprises: transmitting, from the first base station, a termination request to the relay terminal after establishing the direct connection between the first base station and the first terminal; and receiving, at the first base station, a termination acknowledgment from the relay terminal.

In some embodiments, the method further comprises preserving the connection between the first base station and the relay terminal.

In some embodiments, the method further comprises receiving, at the first base station, a radio resource control (RRC) connection request from the first terminal; and transmitting, to the first terminal, a RRC connection completion indication from the first base station.

In some embodiments, the method further comprises transmitting, from the first base station, a network registration acknowledgment request to the first terminal.

In some embodiments, the receiving step is executed upon the first terminal entering a coverage area of the first base station.

In some embodiments, the method further comprises determining whether the first terminal enters a coverage area of the first base station.

In some embodiments, the method further comprises determining whether the first terminal enters a coverage area of a second base station.

In some embodiments, the method further comprises transferring data from the first base station to a second base station.

In some embodiments, the method further comprises in response to determining the first terminal leaves a coverage area of the first base station and enters a coverage area of a second base station, transferring data from the first base station to the second base station.

In some embodiments, the method further comprises determining whether the connection between the first terminal and the relay terminal is broken.

In some embodiments, the method further comprises determining whether the relay terminal leaves a coverage area of the first base station.

In some embodiments, the method further comprises determining whether the relay terminal enters a coverage area of a second base station.

In some embodiments, the method further comprises determining whether the relay terminal leaves a coverage area of the network (i.e., the relay terminal is not within the coverage area of any base station associated with the network).

In some embodiments, the relay terminal transmits a message to the first terminal upon leaving the coverage area of the network and the first terminal either attempts to establish a direct connection to the network or searches for a new relay terminal for establishing a connection to the network.

In some embodiments, the first terminal or the relay terminal comprises at least one of a mobile computing device, a mobile phone, a television, a watch, or a tablet computing device.

In some embodiments, the network is based on $3^{rd}$ Generation Partnership Project (3GPP) specification.

In some embodiments, an apparatus is provided for executing a handover associated with relay termination. The apparatus comprises: a memory; a processor; and a module stored in the memory, executable by the processor, and configured to: receive a network registration request from a first terminal, the first terminal being connected to the apparatus via a relay terminal; establish a direct connection between the apparatus and the first terminal; and terminate the connection between the first terminal and the relay terminal.

In some embodiments, a computer program product is provided for executing a handover associated with relay termination. The computer program product comprises a non-transitory computer-readable medium comprising a set of codes for causing a computer to: receive a network registration request from a first terminal, the first terminal being connected to the computer via a relay terminal; establish a direct connection between the computer and the first terminal; and terminate the connection between the first terminal and the relay terminal.

BRIEF DESCRIPTION OF THE DRAWINGS

Figure 1:
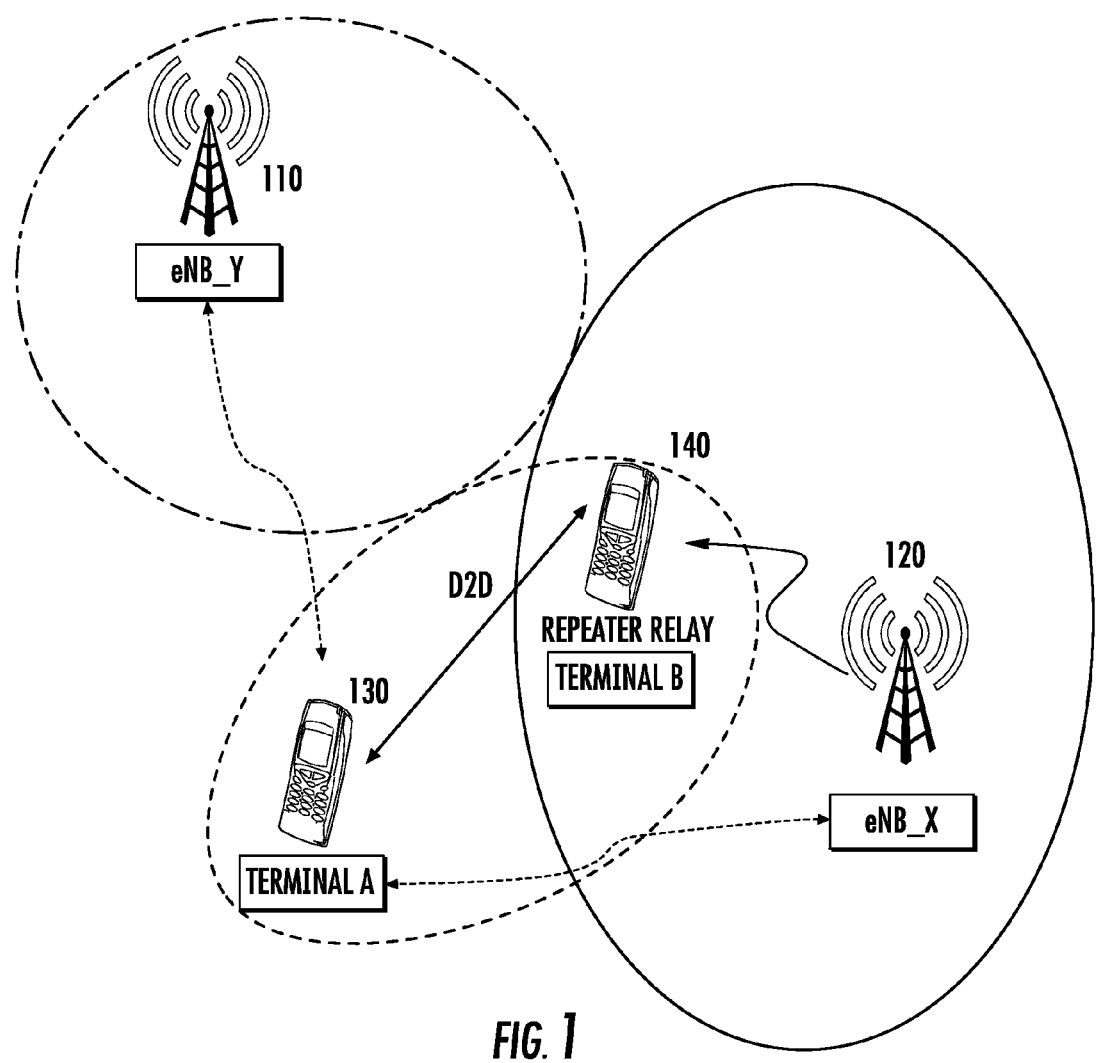

Having thus described embodiments of the invention in general terms, reference will now be made to the accompanying drawings, where:

FIG. 1 is an exemplary network environment for handover associated with relay termination, in accordance with embodiments of the present invention; and FIGS. 2-6 are exemplary signaling procedures for handover associated with relay termination, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The present invention is directed to a relay release procedure that can be used when handling mobility aspects and/or aborting relaying functionality associated with mobile network services (such as emergency traffic routing) under the 3$^{rd}$ Generation Partnership Project (3GPP) standard.

3GPP is considering standardizing mobile terminals to act as relays. As used herein, a relay terminal (or repeater terminal or repeater relay terminal) enables radio communication between a base station associated with the network and a second terminal that may be outside the coverage area of the network. Additionally, a relay terminal enables device to device (D2D) communication between two other terminals. One use case for a terminal to act as a relay could be to improve network coverage to accommodate emergency services. Other use cases are also possible, and this invention is not limited to any particular use cases.

Referring now to FIG. 1, FIG. 1 presents an exemplary network environment. FIG. 1 presents a base station X 120, a base station Y 110, a terminal A 130, and a repeater relay terminal B 140. Terminal A 130 communicates (receives and sends traffic) with base station X 120 via relayed signaling from terminal B 140, which directly communicates with base station X 120. Base station X 120 and base station Y 110 may be associated with the same network. Terminal A 130 and terminal B 140 may move into (e.g., less than or equal to a particular distance) and out of (e.g., greater than a particular distance) the coverage areas of base station X 120 and base station Y 110. The particular distance may depend on aspects of the terminal (e.g., type of antenna, number of antennas, etc.).

The present invention considers mobility aspects based on the starting scenario illustrated in FIG. 1. The following five mobility events are considered: (1) Terminal A 130 is moving into ordinary direct link coverage of base station X 120 (corresponds to FIG. 2), (2) Terminal A 130 is moving into ordinary direct link coverage of base station Y 110 (corresponds to FIG. 3), (3) Terminal A 130 (and/or terminal B 140) is moving so that the connection between terminal A 130 and terminal B 140 is broken or lost (corresponds to FIG. 4), (4) Terminal B 140 is moving into the coverage area of base station Y 110 and out of the coverage area of base station X 120 (corresponds to FIG. 5), and (5) Terminal B 140 is moving out of network coverage (corresponds to FIG. 6), i.e., out of the coverage areas of both base station X 120 and base station Y 110.

During events 1 and 2, terminal A 130, instead of remaining out of ordinary network coverage, is reaching an ordinary coverage area for a base station (e.g., base station X 120), or for another base station within the same network. When that occurs, a solution is required to handle the case where the relaying functionality should be ended and traffic should instead be transmitted via a direct link between the network base station (e.g., base station X 120) and terminal A 130. Terminal A 130 does not terminate the relay connection until terminal A 130 first establishes a connection with base station X 120. In some embodiments, the relay terminal B 140 may continue to be connected to the base station X 110 even though the relaying activity (or the relay connection between terminal A 130 and terminal B 140) is terminated. For example, the relay terminal B 140 may have another ongoing data session with base station X 110, and that data session is not terminated when the handover procedure is executed (i.e., when the terminal B 140's relaying activity is terminated).

The transition from using a relaying terminal (e.g., terminal B 140) towards direct communication between terminal A 130 and base station X 120 is referred to as a handover. An ordinary legacy handover procedure is relatively complex signaling-wise compared to what a relaying terminal can handle. Additionally, in case the base station transmitting the traffic signal remains the same (i.e., the base station transmitting the traffic signal to relay terminal B 140 prior to the handover and the base station transmitting the traffic signal directly to terminal A 130 after the handover), the procedure is not an inter-base station handover. Therefore, the present invention proposes a new relay-release procedure that can be utilized for these events (e.g., events 1 and 2). For events 1 and 2, a description of the proposed signaling procedures are presented in FIGS. 2 and 3, respectively, depending on if the source base station (base station X 120) is the origin of the relayed transmission (event 1), or if the identified base station (base station Y 110) is the origin of the relayed transmission (event 2). Additionally, signaling procedures (including signaling flows and connection handling) for events 3, 4 and 5 are described in FIGS. 4, 5, and 6.

Figure 2:
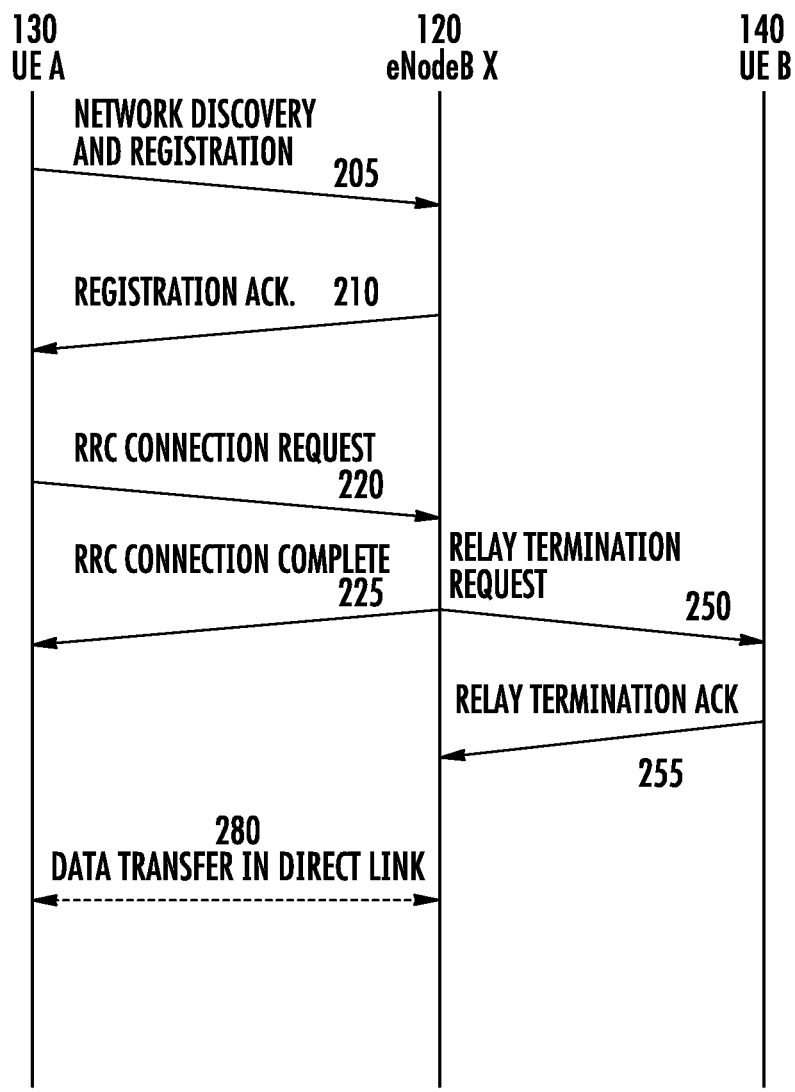

Referring now to FIG. 2, FIG. 2 illustrates event 1. Event 1 comprises terminal A 130 moving into the coverage area of base station X 120. Prior to entering the coverage area of base station X 120, terminal A 130 was outside the coverage area of base station X 120 and communicated with base station X 120 via relay terminal B 140. Upon identifying the signal from base station X 120, terminal A 130 conducts network authentication and registration to the network (block 205). Base station X 120 sends a registration acknowledgment signal to terminal A 130. The network recognizes that terminal A 130 is already within its coverage by means of a relaying terminal within the same cell (same base station), and initiates the handover procedure. In this case, base station X 120 has knowledge about ongoing data sessions, and can continue the connection with terminal A 130. The handover procedure is conducted by means of base station X 120 transmitting a relay termination request to relaying terminal B 140, and a continued session indication (block 225—Radio Resource Control (RRC) connection complete indication) to terminal A 130 in response to receiving a RRC connection request (block 220) from terminal A 130. Relaying terminal B 140, upon reception of the termination request indicator (block 250), acknowledges the signal (block 255) and stops its relaying activity for terminal A 130. Subsequently, terminal A monitors signals from base station X 120 (and does not monitor signals from relaying terminal B 140) and continues ordinary communication (block 280) with base station X 120.

Figure 3:
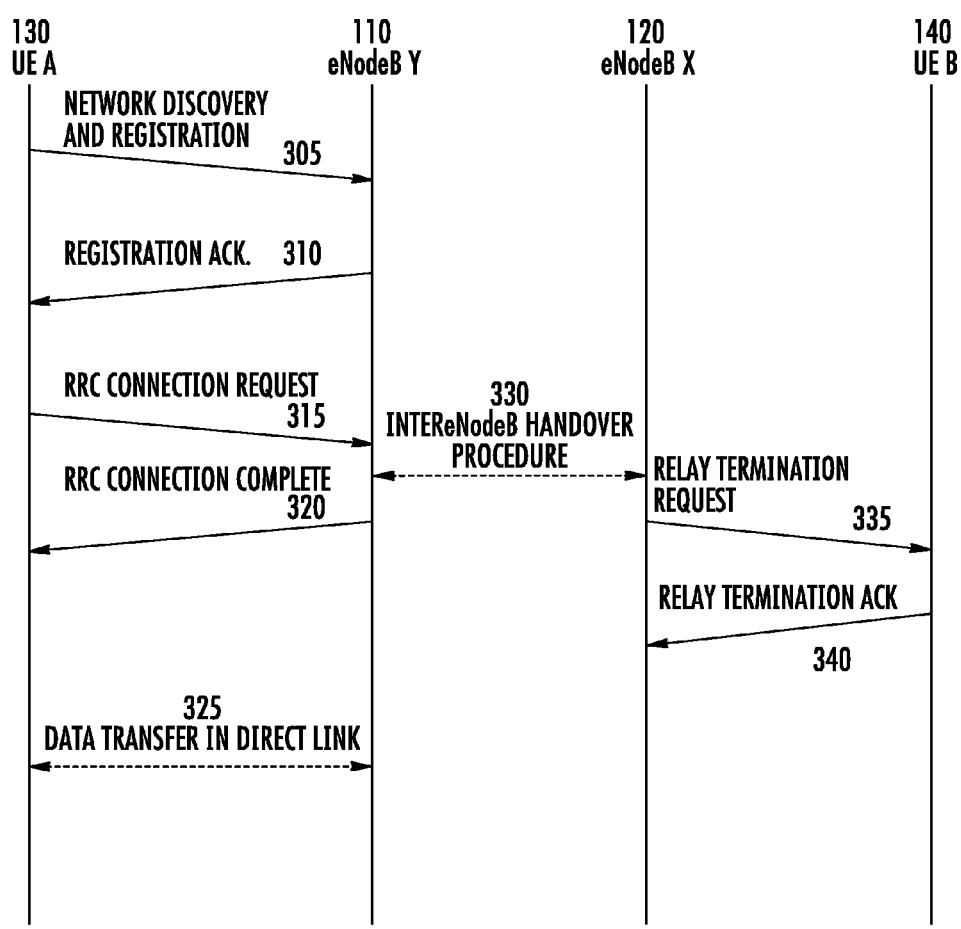

Referring now to FIG. 3, FIG. 3 illustrates event 2. Upon identifying the signal from network base station Y 110, terminal A 130 conducts network authentication and registration (block 305) to the network. Base station Y 110 sends a registration acknowledgment signal (block 310) to terminal A 130. The network core recognizes that terminal A 130 is already within its coverage, but that it is currently being covered by relaying from another cell (base station X 120). In this case, the new base station Y 110 does not have knowledge about the ongoing data session conducted between terminal A 130 and base station X 120 via relaying terminal B 140. Within the core network, a handover procedure (block 330) can be conducted, transferring required information from the current serving base station (base station X 120) to new primary base station (base station Y 110). In the terminal-to-base station interface, a handover is conducted as follows. Base station X 130 transfers a relay termination request (block 335) to relaying terminal B 140, and a continued session indication (block 320) is sent to terminal A 130 from base station Y 110 in response to receiving a RRC connection request (block 315) from terminal A 130. Relaying terminal B 140, upon reception of the termination request, acknowledges (block 340) the signal and stops its relaying activity. Subsequently, terminal A 130 monitor signals from new base station Y 110 (and does not monitor signals from relaying terminal B 140) and commences ordinary communication (block 325) with new base station Y 110.

Figure 4:
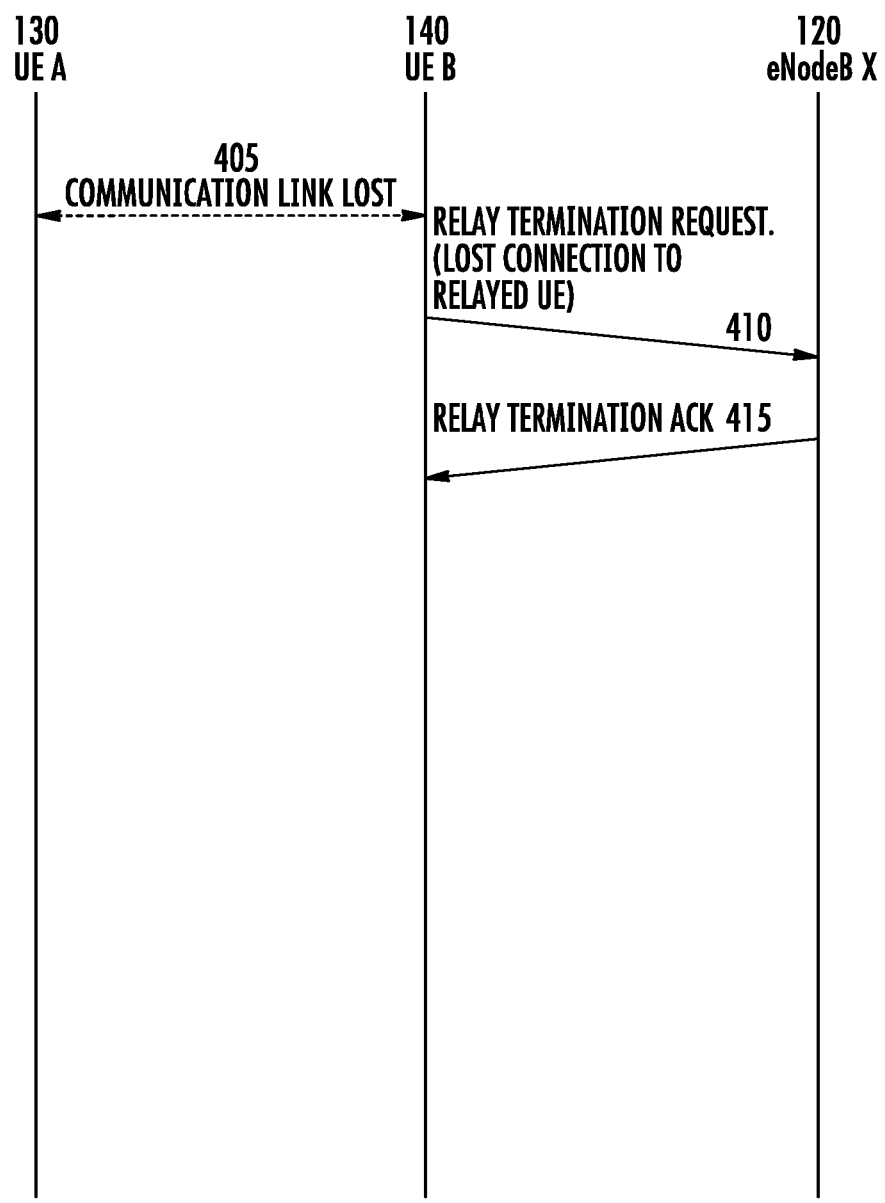

Referring now to FIG. 4, FIG. 4 illustrates event 3. Upon identifying that relaying terminal B 140 has lost connection (block 405) with terminal A 130, terminal B 140 sends an indication (block 410) to base station X 120 reporting that the relay link has been broken. Base station X 120 responds (block 415) to terminal B 140 and acknowledges that the relay functionality is terminated. Terminal A 130 can then conduct a search to find a new candidate relay node.

Figure 5:
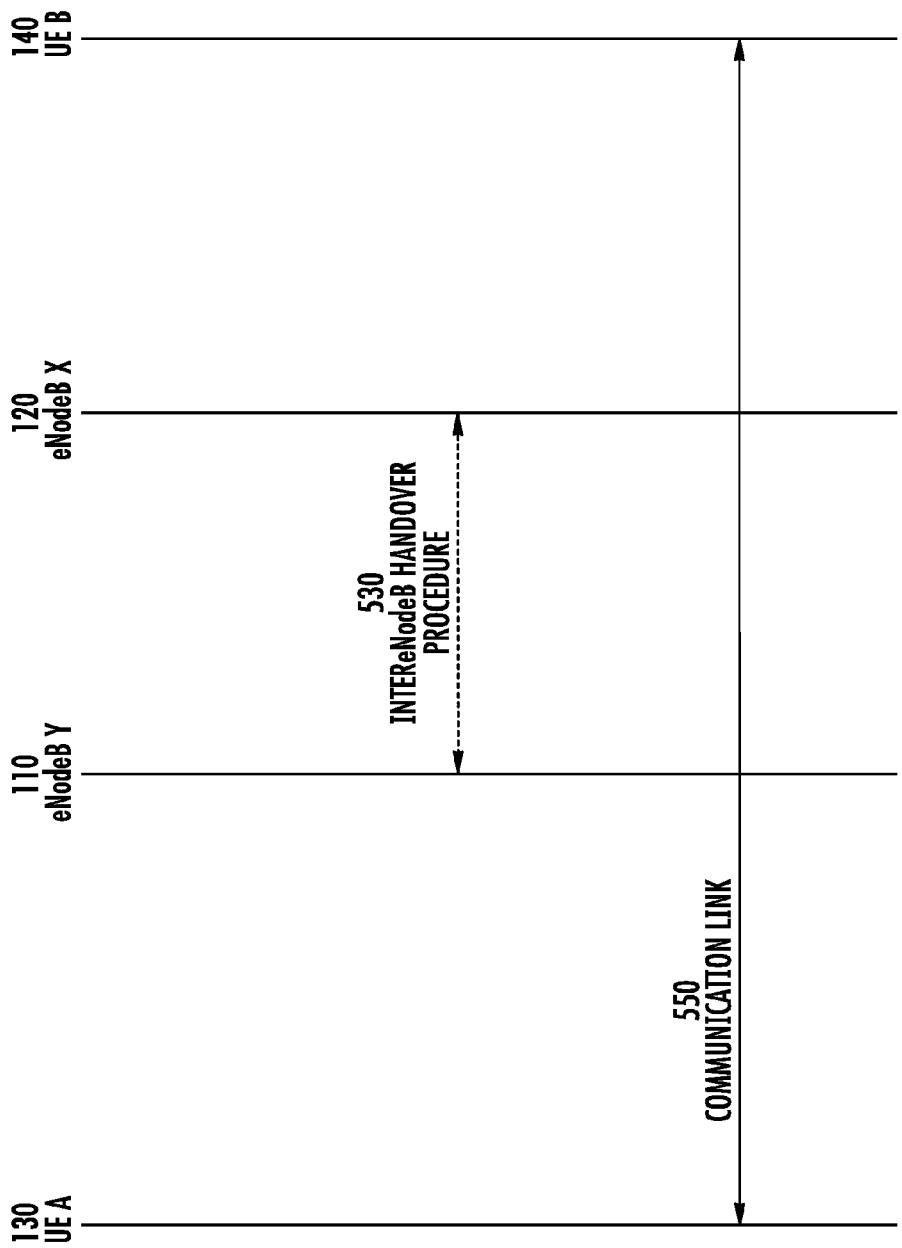

Referring now to FIG. 5, FIG. 5 illustrates event 4. If terminal B 140 moves from the coverage area of base station X 120 into the coverage area of base station Y 110, a mobile relay handover (block 530) is conducted between base station X 120 and new primary base station Y 110. The handover transfers required information from the current serving base station (base station X 120) to new primary base station (base station Y 110) in order for terminal A 130 to establish continued communication (block 550) with the network via relaying terminal B 140.

Figure 6:
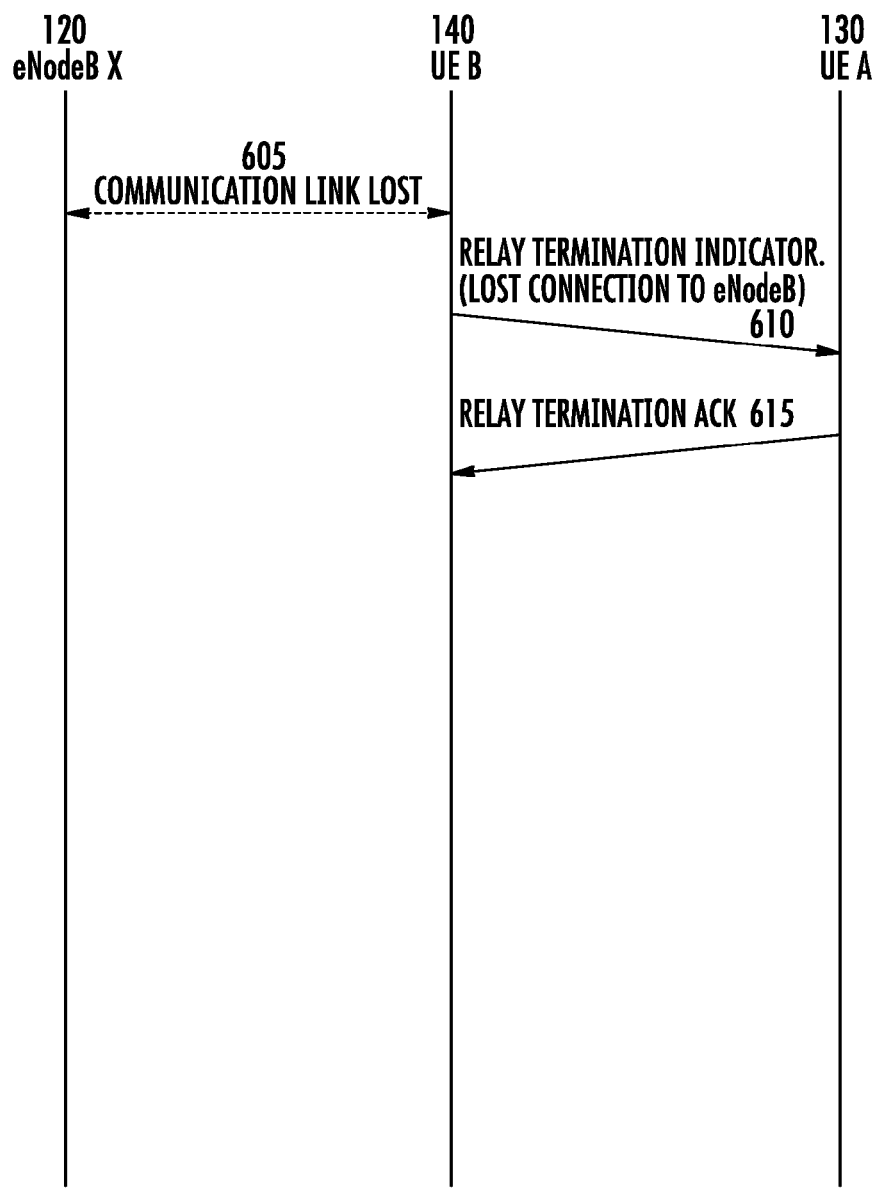

Referring now to FIG. 6, FIG. 6 illustrates event 5. When terminal B 140 gets out of the coverage area (block 605) of the network associated with base station X 120, it sends (block 610) a message to terminal A 130 indicating that it will no longer relay data to terminal A 130. Terminal A 130 then sends (block 615) an acknowledgement of the indication to terminal B 140. Terminal A 130 subsequently conducts a search to find a new candidate relay node.

The terminal described herein comprises at least one of a mobile computing device, a non-mobile computing device, a mobile phone, a television, a watch, or a tablet computing device. The terminal (and/or base station associated with the network) comprises a processor, a memory, and a module stored in the memory, executable by the processor, and configured to perform the various processes described herein. The processor described herein generally includes circuitry for implementing audio, visual, and/or logic functions. For example, the processor may include a digital signal processor device, a microprocessor device, and various analog-to-digital converters, digital-to-analog converters, and other support circuits. The processor may also include functionality to operate one or more software programs based at least partially on computer-executable program code portions thereof, which may be stored, for example, in a memory.

The memory may include any computer-readable medium. For example, the memory may include volatile memory, such as volatile random access memory (RAM) having a cache area for the temporary storage of information. The memory may also include non-volatile memory, which may be embedded and/or may be removable. The non-volatile memory may additionally or alternatively include an EEPROM, flash memory, and/or the like. The memory may store any one or more of pieces of information or data.

Any function or process that is described as being performed by the network may be performed by the terminal, and any function or process that is described as being performed by the terminal may be performed by the network. Any function or process that is described as being performed by the network may be performed by the base station associated with the network. As used herein, the terms "device," "node," "terminal," and "user equipment" or "UE" may be used interchangeably. The various features described with respect to any embodiments described herein are applicable to any of the other embodiments described herein. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for executing a handover associated with relay termination, the method comprising:

in response to a first terminal moving from a location outside of a coverage area of a first base station to a location inside a coverage area of a second base station, receiving, at the second base station associated with a network, a network registration request from the first terminal, the first terminal being currently connected to the first base station via a relay terminal that is located within the coverage area of the first base station and has a current data session established with the first base station;

transmitting, from the second base station to the first terminal, a network registration acknowledgment;

receiving, at the second base station, a radio resource control (RRC) connection request from the first terminal, wherein in response to receiving, at the second base station, the connection request from the first terminal, an inter-base station handover procedure is conducted between the first base station and the second base station that includes receiving, at the second base station, information associated with the first terminal transferred directly from the first base station; and executing a handover operation that results in establishing a direct connection between the second base station and the first terminal, wherein signaling associated with the handover operation comprises (i) in response to receiving, at the second base station, the RRC connection request from the first terminal, transmitting, from the second base station to the first terminal, a RRC connection complete indication, and (ii) in response to completion of the inter-base station handover procedure, transmitting, from the first base station to the relay terminal, a relay termination request and receiving, at the first base station, a relay termination acknowledgement from the relay terminal, wherein signaling in connection with the relay terminal included in the handover operation consists of receiving the relay termination request and transmitting the relay termination acknowledgement.

2. The method of claim 1, further comprising determining whether the first terminal enters the coverage area of the second base station.

3. The method of claim 1, wherein the information is transferred from the first base station to the second base station in response to the first terminal moving from the location outside the coverage area of the first base station to the location inside the coverage area of the second base station.

4. The method of claim 1, further comprising determining whether the connection between the first terminal and the relay terminal is broken.

5. The method of claim 1, wherein the first terminal comprises at least one of a mobile computing device, a mobile phone, a cellular network-enabled television, a cellular network-enabled watch, or a cellular network-enabled tablet computing device.

6. A system for executing a handover associated with relay termination, the system comprising:

a memory;

at least one processor; and a module stored in the memory, executable by the at least one processor, and configured to:
in response to a first terminal moving from a location outside of a coverage area of a first base station to a location inside the coverage area of a second base station, receive a network registration request from the second terminal, the first terminal being currently connected to the first base station via a relay terminal that is located within the coverage area of the first base station and has a current data session established with the first base station,
transmit a network registration acknowledgment to the first terminal, receive, at the second base station, a connection request from the first terminal,
in response to receiving the radio resource control (RRC) connection request from the first terminal, execute an inter-base station handover procedure between the first base station and the second base station that includes receiving, at the second base station, information associated with the first terminal transferred directly from the first base station, and
execute a handover operation that results in establishing a direct connection between the first base station and the first terminal, the handover operation including (i) in response to receiving the RRC connection request from the first terminal, transmitting a RRC connection complete indication to the first terminal, and (ii) in response to completion of the inter-base station handover procedure, transmitting, from the first base station to the relay terminal, a relay termination request and receiving, at the first base station, a relay termination acknowledgement from the relay terminal, wherein signaling in connection with the relay terminal included in the handover operation consists of receiving the relay termination request and transmitting the relay termination acknowledgement to complete the handover operation.

7. A computer program product for executing a handover associated with relay termination, the computer program product comprising:

a plurality of non-transitory computer-readable medium comprising a set of codes for causing one or more computers to:
in response to a first terminal moving from a location outside of a coverage area of a first base station to a location inside the coverage area of a second base station, receive a network registration request from the second terminal, the first terminal being currently connected to the first base station via a relay terminal that is located within the coverage area of the first base station and has a current data session established with the first base station;
transmit, a network registration acknowledgment to the first terminal;
receive, at the second base station, a radio resource control (RRC) connection request from the first terminal;
in response to receiving the connection request from the first terminal, execute an inter-base station handover procedure between the first base station and the second base station that includes receiving, at the second base station, information associated with the first terminal transferred from the first base station; and
execute a handover operation that results in establishing a direct connection between the first base station and the first terminal, the handover operation including (i) in response to receiving the RRC connection request from the first terminal, and (ii) in response to completion of the inter-base station handover procedure, transmitting, from the first base station to the relay terminal, a RRC relay termination request and receiving, at the first base station, a relay termination acknowledgement from the relay terminal, wherein signaling in connection with the relay terminal included in the handover operation consists of receiving the relay termination request and transmitting the relay termination acknowledgement.

* * * * *